US010158426B2

(12) United States Patent
Katiyar et al.

(10) Patent No.: US 10,158,426 B2
(45) Date of Patent: Dec. 18, 2018

(54) FIRMWARE UPDATES USING VISIBLE LIGHT MEDIUM

(71) Applicant: Dell Products L.P., Round Rock, TX (US)

(72) Inventors: Shivendra Katiyar, Bangalore (IN); Naman Goel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 59 days.

(21) Appl. No.: 15/581,755

(22) Filed: Apr. 28, 2017

(65) Prior Publication Data

US 2018/0316425 A1    Nov. 1, 2018

(51) Int. Cl.

| H04B 10/66 | (2013.01) |
|---|---|
| H04B 10/116 | (2013.01) |
| G06F 8/65 | (2018.01) |
| H04L 12/24 | (2006.01) |
| H04B 10/516 | (2013.01) |
| H04L 29/08 | (2006.01) |

(52) U.S. Cl.
CPC ............ *H04B 10/116* (2013.01); *G06F 8/65* (2013.01); *H04B 10/516* (2013.01); *H04B 10/66* (2013.01); *H04L 41/082* (2013.01); *H04L 67/10* (2013.01)

(58) Field of Classification Search
CPC ... H04B 10/116; H04B 10/11; H04B 10/1121; H04B 10/1141; H04B 10/1143; H04B 10/516; H04B 10/66; H04B 10/1149; H04L 41/082
See application file for complete search history.

(56) References Cited

U.S. PATENT DOCUMENTS

| 2011/0135312 A1* | 6/2011 | El-Ahmadi | H04L 1/0057 398/135 |
|---|---|---|---|
| 2011/0305460 A1* | 12/2011 | Snyder | H04B 10/116 398/140 |
| 2017/0104628 A1* | 4/2017 | Vaideeswaran | H04L 41/0816 |

\* cited by examiner

*Primary Examiner* — Ted Wang
(74) *Attorney, Agent, or Firm* — Jackson Walker L.L.P.

(57) ABSTRACT

A system management method and resource for managing a plurality of managed servers in a data center includes providing a firmware update to a plurality of digital light transmitters located in the data center. Each transmitter may be associated with a corresponding subset of the managed servers and each managed server subset may include one or more digital light receivers. The transmitters may be configured to generate digital light indicative of the firmware update by modulating one or more visible light carrier signals in accordance with a modulation technique and the firmware update. Each transmitter may employ LiFi as the digital light protocol and each receiver may comprise a LiFi compliant receiver.

20 Claims, 4 Drawing Sheets

FIRMWARE UPDATES USING VISIBLE LIGHT MEDIUM

TECHNICAL FIELD

The present disclosure generally relates to information handling system management and, more particularly, methods for implementing firmware updates for a potentially large number of systems.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling system's may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

For a variety of reasons, information handling system software, including the basic input/output system (BIOS), as well as driver software, whether native to the operating system (OS) or provided by a third party, may require or benefit from periodic updates. For the sake of brevity and clarity, such software is collectively referred to herein as firmware. Ensuring that firmware updates are implemented consistently, uniformly, and efficiently so that all systems have a known and uniform state can be difficult.

Existing methods to update firmware in a server include updates using in-band or OS-controlled communication channels. In-band software updates are undesirable because they consume central processing unit (CPU) compute cycles, network bandwidth, and other resources that are designed to operate on workload applications. As such, in-band updates may require some form of dedicated downtime during which updates may be installed without disrupting or otherwise impacting workload applications.

The primary alternative to in-band updates, predictably referred to as out-of-band updates, generally refer to processes for updating firmware using a service processor (SP), access controller, remote access controller (RAC), management controller, baseboard management controller (BMC), or the like. While conventional out-of-band updating alleviates, at least to some extent, the primary drawbacks of in-band updates, out-of-band updates require additional networking infrastructure for basic configuration and setup. Generally, the remote access controller requires some form of Internet access, whether wireless or otherwise, to enable remote management and customers may be unaware or unskilled regarding the requirements of a functional out-of-band management network.

Additionally, whether in-band or out-of-band, the firmware update process generally involves a repetitive transmission of a common block of data to multiple recipients, e.g., a single driver being copied from a management system to multiple servers or to multiple remote access controllers.

SUMMARY

Disclosed subject matter addresses a need to provide an adaptable firmware update mechanism that alleviates bandwidth utilization issues, performance issues, time/cost issues, and other issues associated with conventional firmware update techniques. Disclosed subject matter introduces a method to update firmware on multiple servers using a single data object broadcasted or delivered as light to one or more resources.

The detailed description to follow refers to digital light, i.e., one or more visible carrier signals modulated in accordance with firmware data and any of various modulation techniques. In at least one embodiment, the digital light referred to herein may be implemented using Light Fidelity (LiFi) signals. LiFi is referenced as an exemplary implementation of digital light at least in part because LiFi offers a combination of desirable features and benefits. As non-limiting examples, LiFi provides a spectrum that is 10,000 times broader than the radio frequency spectrum used in WiFi. In other words, LiFi provides potentially unlimited bandwidth to work with, especially when there is a need to transmit large files.

Because LiFi-compliant light emitting diodes (LEDs) switch or flicker at extremely high speed, a LiFi-modulated signal does not produce a human detectable flicker and therefore does not detract from the LEDs as a source of illumination. Direct line of sight is beneficially not necessary for LiFi to transmit a signal. Light reflected off walls can achieve 70 Mbit/s transmission speed. In addition, LiFi offers the opportunity to at least partially illuminate a data center via the same signal generation and transmission infrastructure used to deliver data to server endpoints. Further, LiFi can be used to provide an extremely high speed and secure link for an Internet connection.

Once LiFi transmitters and LiFi receivers have been properly positioned, the infrastructure is highly likely to continue to serve optimally with little if any need of maintenance in this aspect. In embodiments in which managed servers may be configured with LiFi receivers only, the LiFi communication in the data center 101 is one directional, from digital light transmitters to managed servers. Nevertheless, the success or failure of any update transmission can be reported via traditional management networks in a large number of cases.

In accordance with disclosed subject matter, a system management method performed at least in part, by a management resource configured to manage a plurality of managed servers in a data center, includes accessing a firmware update and providing update information indicative of the firmware update to each of a plurality of digital light transmitters located in the data center. Each of the plurality of digital light transmitters may be associated with a corresponding subset of the plurality of managed servers. In such embodiments, each managed server subset includes one or more digital light receivers and the digital light transmitters may be configured to generate digital light indicative of the firmware update by modulating one or more visible light carrier signals in accordance with a modulation technique and the firmware update.

Each digital light transmitter may include a LiFi-compliant transmitter and each digital light receiver may comprise a LiFi-compliant receiver. In one embodiment, each managed server includes a corresponding digital light receiver such that there is a 1:1 correspondence between digital light receivers and managed servers. In another embodiment, a subset of managed servers includes a single digital light receiver associated with a particular managed server. In this embodiment, there is a 1:1 correspondence between digital light transmitters and digital light receivers. In such an embodiment, the particular managed sever may be configured to distribute the firmware update to the other managed servers in the subset. In some embodiments, the digital light transmitters provide at least a partial source of illumination within at least a portion of the data center.

Each managed resource may comprise a service that includes a BMC configured to receive the firmware update from a digital light receiver. The firmware update may comprise a digitally signed data object and the BMC may be configured to verify the signature. In addition, the digitally signed data object may comprise executable code in addition to a firmware update payload and the BMC may be configured to execute the code to install the firmware update.

In some embodiments, the data center may comprise a heterogeneous data center that includes two or more different types of managed servers. For purposes of this disclosure, a managed server's type may be indicated by one or more attributes including, as non-limiting examples, an OS attribute, a firmware level attribute, a hypervisor attribute indicative of whether the managed server includes a hypervisor, or a container attribute indicative of whether the managed server is container-capable.

In such heterogeneous embodiments, the data center may be configured wherein a first set of one or more digital light transmitters is associated with managed servers of a first type, a second set of one or more digital light transmitters is associated with managed servers of a second type, and so forth. In such data centers, the management resource may maintain or have access to a data structure indicating associations between sets of digital light transmitters and groups of managed servers. Whenever a new firmware update is stored in the repository, information regarding the server type for which the firmware update is appropriate may be provided to the management resource, thereby enabling the management resource to initiate a firmware update selectively, with only those digital light transmitters associated with a compatible managed server. In other embodiments, server type information may be embedded in the firmware update. In these embodiments, the firmware update may be provided to all digital light transmitters, transmitted to all digital light receivers, and forwarded to all BMCs. In such cases, the BMC may be configured to determine the server type and to determine, based on the server type, whether to install the firmware update to the applicable managed systems.

In one embodiment of a data center suitable for use in conjunction with distributing firmware updates via digital light, digital light transmitters are located at regular intervals throughout the data center and wherein the maximum spacing is determined at least in part by the range of the digital light components. In a LiFi implementation, as an example, spacing between adjacent digital light transmitters may be less than approximately 10 meters.

Any of various modulation techniques may be employed to encode the carrier signal(s) with applicable data. In single carrier embodiments, the modulation technique employed may be on-off keying modulation, variable pulse position modulation, and pulse amplitude modulation. In multiple carrier signal embodiments, the modulation may include orthogonal frequency division multiplexing. In still other embodiments, the digital light transmitter may perform color shift key.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
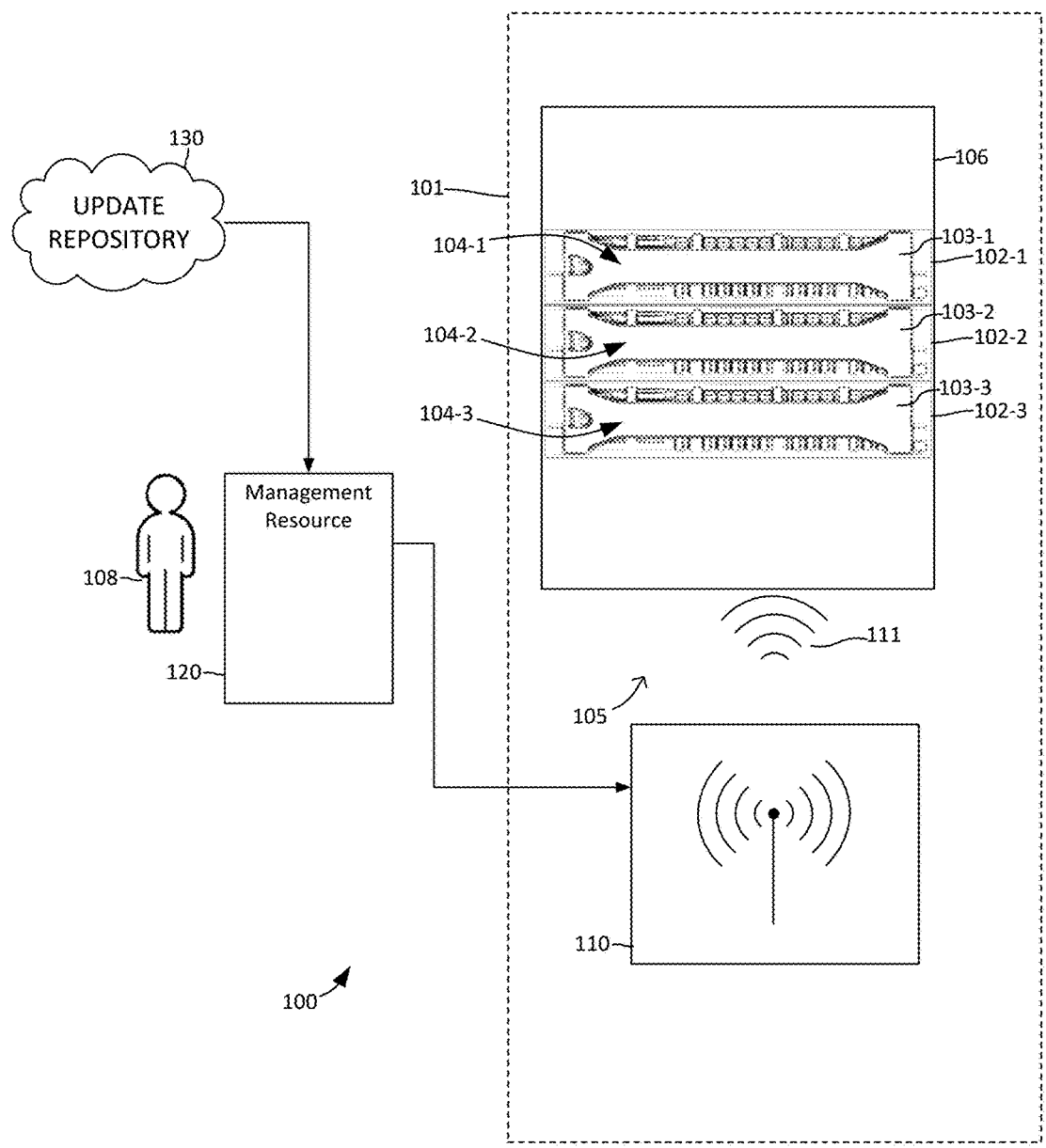
FIG. 1 illustrates a selected elements of a platform suitable for distributing firmware updates to multiple systems using a digital light transmission medium.

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware (F/W) described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As used herein, "light" and "visible light" are synonymous unless expressly stated otherwise and both refer to electromagnetic energy having a wavelength in the range of approximately 400 nm to approximately 700 nm. As used herein, "digital light" refers to a signal comprising one or more visible light carrier signals modulated in accordance with binary data and any of various suitable modulation techniques. See, e.g., H. Haas, L. Yin, Y. Wang, and C. Chen, *What is LiFi*, Journal of Lightwave Technology, Vol. 34, No. 6, (IEEE March, 15 2016), 1533-44, the entirety of which is incorporated by reference herein.

A disclosed firmware update process employs data broadcasting using LiFi technology to distribute firmware update payloads substantially simultaneously to a plurality of information handling systems. As suggested previously, LiFi is an emerging, standards-based communication technology that supports wireless, bidirectional, high-speed, and networked transmission via one or more carrier signals in the visible portion of the electromagnetic spectrum. Analogous to WiFi in at least some respects, LiFi transmits data via light generated by LEDs.

Referring to FIG. 1, an information handling platform 100 configured to distribute a firmware update, or another suitable data object, to a plurality of managed information handling systems, more simply referred to herein as managed systems or manager servers, by generating digital light in proximity to the managed servers where the digital light is indicative of the firmware update. Although a firmware update is referenced as the data object in much of the detailed description, the data object could be substantially any data structure required by two or more information handing resources.

Data center 100 may include tens or hundreds of servers or other information handling systems sharing substantially the same operating system and firmware configuration. In such environments digital light may be used to broadcast firmware updates to the servers. One or more digital light transmitters may be deployed in the data center such that each server in the data center is sufficiently close to a digital light transmitter to receive digital light generated by the transmitter either directly or indirectly via reflections.

The information handling platform 100 illustrated in FIG. 1 includes a management resource 120 coupled to a digital light transmitter 110 located within a data center 101. Data center 101 may include a large number of information handling resources 102 and, in such environments, digital light transmitter 110 may be associated with a subset 105 of the information handling resources 102. The subset 105 of information handling resources 102 may include information handling resources 102 located within a particular distance of digital light transmitter 110. Multiple digital light transmitters 110 may be required to provide digital light support to managed servers located in distant or remote regions of a data center or other environment.

In at least one embodiment, digital light transmitter 110 generates digital light 111. Digital light 111 may include one or more carrier signal modulated in accordance with binary data and a suitable modulation technique or algorithm wherein the digital light 111 is indicative of the binary data. Each of the one or more carrier signals included within digital light 111 may be a carrier signal having a wavelength in the 400 to 700 nm wavelength region.

The data center 101 illustrated in FIG. 1 includes a plurality of rack mount servers 102 on a plurality of rack cabinets 106 (only one of which is illustrated). Each of the rack servers 102 illustrated in FIG. 1 includes a bezel 103 equipped with an embedded or integrated digital light receiver 104. Although FIG. 1 illustrates digital light receivers 104 embedded in rack server bezels 103, this is an implementation detail and other embodiments of rack mount servers may integrate a digital light receiver 104 without a rack server bezel 103. Similarly, although FIG. 1 illustrates a plurality of rack servers 102, firmware updates may be distributed to other types of information handling resources including, as non-limiting examples, storage enclosures, network switches, BMCs, and so forth.

FIG. 1 illustrates a data center administrator 108, or other user, interfacing with management resource 120 through a graphical user interface (not depicted), command line prompt, or other form of interface, to initiate a firmware update for data center 101. In some embodiments, all rack servers 102 are of like kind and, in such cases, a firmware update may be applied to all rack servers 102. In some cases, data center 101 includes different types of servers and other information handling resources. In such cases, the update may be applied selectively, for example, by enabling only those digital light receivers 104 associated with information handling resources of a specific type while disabling the digital light receivers 104 of rack servers 102 and other information handling resources of other types of devices.

The digital light transmitter 110 may include or encompass LiFi-capable floor lamps (not depicted explicitly). In any of these embodiments, the digital light transmitter 110 may serve a dual function by at least partially illuminating data center 101 while transmitting data to information handling resources 102.

In at least some embodiments, the digital light receivers 104 include a silicon photo-diode to receive light signals encoded with data and a signal processing element to convert the encoded data into stream-able content. Although FIG. 1 illustrates a digital light receiver 104 corresponding to each managed server 102, other embodiments may employ fewer digital light receivers including, as an example, embodiments in which a group of information handling resources 102 associated with a digital light transmitter 110 share a common digital light receiver 104, which may capture the digital light and distribute the data to each resource coupled to the receiver.

Figure 2:
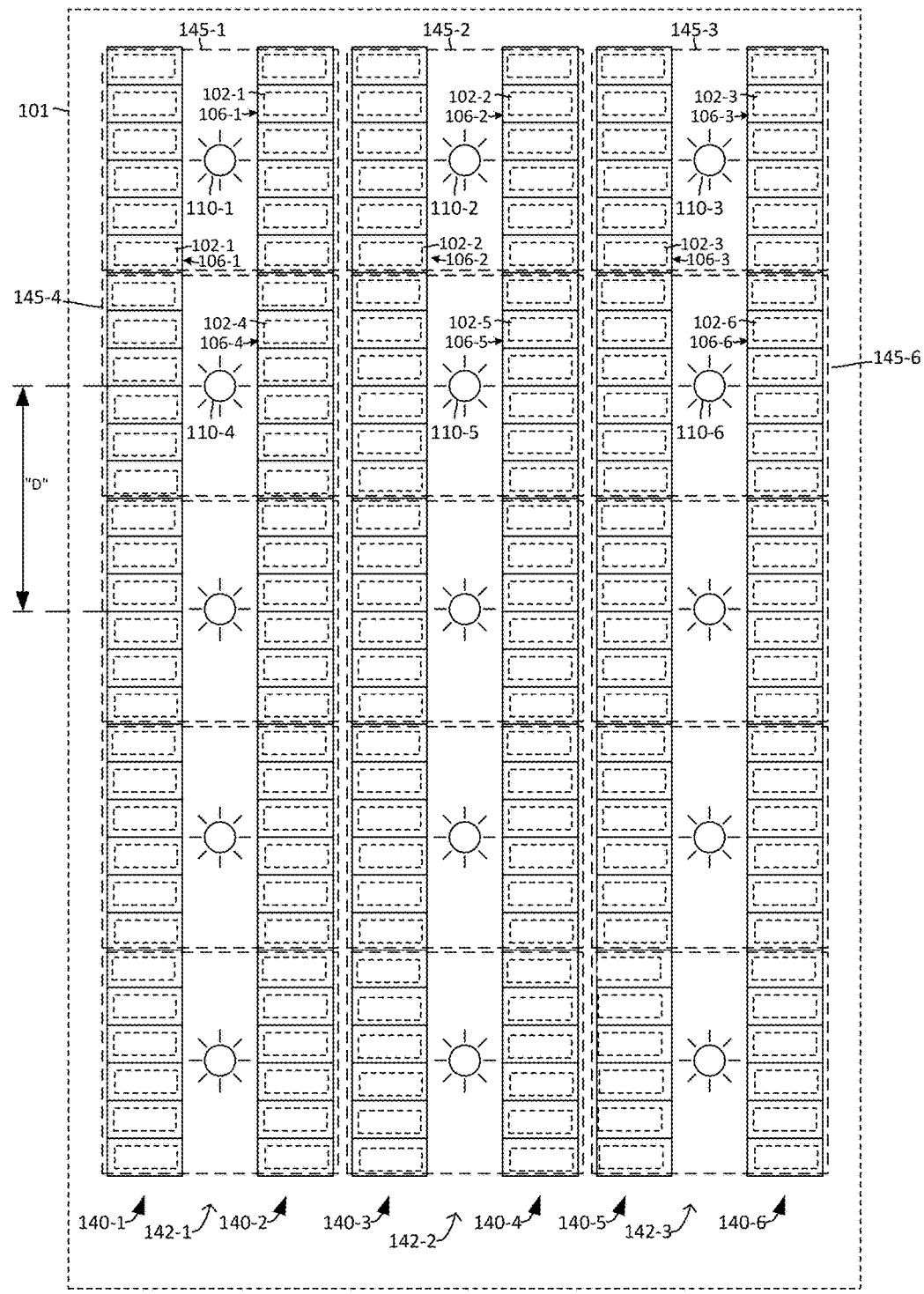
FIG. 2 illustrates a top view of a data center employing multiple digital light transmitters to support digital light delivery of firmware updates to more information handling systems that could be supported by a single digital light transmitters.

FIG. 2 illustrates a top view of an example data center 101. The data center 101 illustrated in FIG. 2 includes a plurality of rows 140-1 through 140-6 wherein each row 140 includes a plurality of a rack cabinets 106, each of which may contain one or more information handling resources 102. The rows 140 illustrated in FIG. 2 are arranged in parallel pairs on either side of a corresponding aisle 142. As depicted in FIG. 2, rows 140-1 and 140-2 are located on either side of aisle 142-1, rows 140-3 and 140-4 are located on either side of aisle 142-2, and rows 140-5 and 140-6 are located on either side of aisle 142-3.

FIG. 2 further illustrates a manner in which information handling resources 102 of data center 101 may be grouped in accordance with digital light delivery of a firmware updates or an update of some other software and/or data structure common to at least some of the information handling resources 102. The data center 101 illustrated in FIG. 2 includes a plurality of like-sized and uniformly spaced information handling resource groups 145, each of which encompasses the same or roughly the same number of rack cabinets 106 and information handling resources 102. In the data center 101 illustrated in FIG. 2, each information handling resource group 145 is associated with a digital light transmitter 110 that transmits digital light to the information handling resources 102 included within the information handling resource group 145. Thus, for example, resource group 145-1, associated with digital light transmitter 110-1 includes the information handling resources 102-1 and rack mount cabinets 106-1.

FIG. 2 illustrates a digital light transmitter 110 located approximately in the center of each information handling resource group 145 such that the digital light transmitters 110 are approximately equally spaced apart at a distance D. The distance between a digital light transmitter 110 of a particular information handling resource group 145 and the information handling resources 102 of the particular information handling resource group 145 varies, but the maximum distance is less than the spacing D between neighboring digital light transmitters.

In at least one implementation of the data center 101 illustrated in FIG. 2, it may be desirable to maximize the distance D such that the population of information handling resources 102 in data center 101 might be managed by the fewest number of digital light transmitters 110. If the cost of digital light transmitters 110 is not a constraining factor, the number of information handling resources 102 associated with each digital light transmitter 110 may be decreased.

FIG. 2 illustrates an example of a tiered configuration for distributing firmware updates to a population of information handling resources 102 in a data center 101. The firmware update may be distributed to each of a first plurality of digital light transmitters 110 by a management resource 120. Each digital light transmitter 110 may then transmit the firmware update to a second tier of information handling resources 102 by generating digital light indicative of the firmware update. If the number of digital light transmitters 110 in the first plurality is represented by the variable T and the number of information handling resources per information handling resource group 145 is represented by the variable G, then the product of G and T represents the number of information handling resources 102 receiving digital light firmware updates. If the maximum number of information handling resources that might be reliably supported by a single digital light transmitter 110 is approximately represented by the variable $G_{max}$, then the minimum number of digital light transmitters 110 required to implement digital light firmware updates as illustrated in FIG. 2 is approximately $S/G_{max}$.

The configuration of data center 101 as described above may correspond to a configuration in which the data center 101 includes a homogenous population of information handling resources 102 including, for example, a group of information handling resources 102 that share common operating system and firmware software. In other embodiments, the servers in one subset 145 may differ in type from the servers in another subset 145. Servers of different types may, as examples, employ different operating systems and/or firmware. In such heterogeneous embodiments, a firmware update may be provided to one type of manager server 102 selectively while a different type of server 102 may remain operational. Selective distribution of a firmware update for a first server type might include selectively pushing the firmware update to only those digital light transmitters 110 associated with the first type of manager server 102.

In at least one embodiment, the digital light transmitters 110 are arranged within data center 101 in such a manner that every data center aisle and rack receives light generated by at least one digital light transmitter 110. Similarly, rack mount servers and chassis should be arranged in a rack in such a manner that each one of them receives light from at least one digital light transmitter 110. Although the light from a digital light transmitter does not have to be received via a direct-line-of-sight, at least some direct or reflected light originating from a digital light transmitter 110 should be received by each server, chassis, or other information handing system in data center 101.

In at least one embodiment, management resource 120 includes a digital light update application that is responsible for controlling the firmware update process. Management resource 120 may also include network connectivity to support communication with remote repository 130 and local storage resources to permit management resource 120 to function as a local repository of update information.

The storage resources of management resource 120 may include, in some embodiments, SD Card storage, vFLash Card storage, or some other suitable form of non-volatile and/or removable storage. The repository 130 may include a virtualized or physical database, accessible via the Internet or a private network, of firmware update files that may be downloaded using FTP or another suitable protocol.

Each server 102 or other resource that is to receive digital light updates may be equipped with or modified to include a receiver bezel 103 with a digital light receiver 104. Servers 102 may be implemented with any of various server systems including rack mount servers such as a PowerEdge brand servers from Dell Inc. The digital light receiver 104 may be configured to receive and demodulate digital light. The digital light receiver 104 may be coupled to BMC 181 and managed server 102 may be configured to convey firmware update information demodulated by the receiver bezel.

For embodiments in which management resource 120 has Internet access and is configured to control the delivery of update information to the information handling resources 102, management resource 120 may synchronize data from external repository 130 and store it locally or push certain updates to the information handling resources 102. Management resource 120 may also maintain a record of firmware updates includes: information uniquely identifying each firmware update, timestamp information indicating when the firmware update was delivered to the management resource and when the firmware update was successfully programmed into the servers.

Figure 3:
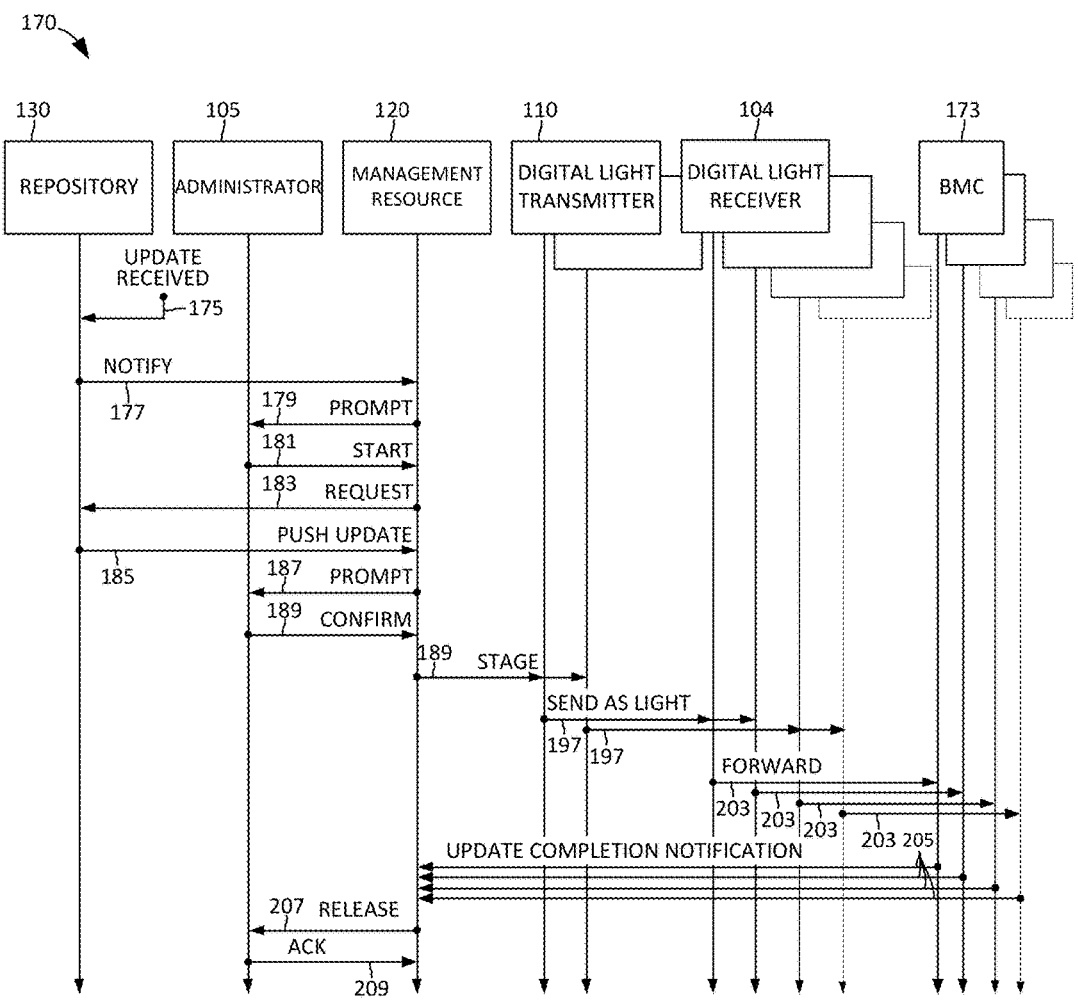
FIG. 3 illustrates a sequence diagram for performing digital light firmware updates on a plurality of information handling resources in a data center.

FIG. 3 is a sequence diagram illustrating a digital light firmware update process 170 as a sequence of messages and events occurring during a digital light firmware update of information handling resources 102 in a data center 101. As illustrated in FIG. 3, the digital light firmware update process 170 may include messages exchanged between or among a firmware update repository 130, an administrator 108, a management resource 120, a digital light transmitter 110, a digital light receiver 104, and a BMC 173.

The firmware update process 170 illustrated in FIG. 3 begins when the repository 130 receives (operation 175) a firmware update. Repository 130 may include a resource maintained by the manufacturer of the information handling system resources 102 to an ever-present resource through which customers can determine whether their firmware and other system software is current and supported.

In the embodiment depicted in FIG. 3, repository 130 notifies (operation 177) management resource 120 when a new firmware update has been received. Firmware updates will be fully confirmed for functionality and authorized for release before being including stored to or otherwise included in repository 130. In such embodiments, notification of the presence of a firmware update in repository 130 may be all that is required to trigger management resource 120 to begin a firmware update. Accordingly, FIG. 3 illustrates management resource 120 prompting (operation 179) administrator 108 to begin a firmware update sequence. Upon receiving the prompt from management resource 120, the administrator 108 may acknowledge prompt 179 by sending (operation 181) a start message 181 back to management resource.

The management resource 120 illustrated in FIG. 3 responds to receiving the start message from administrator 108 by requesting (operation 183) the repository for the firmware update. Repository 130 may the push (operation 185) the firmware update out to management resource 120 in response to receiving request 183 from management resource 120. In the process 170 illustrated in FIG. 3, management resource 120 again prompts (operation 187) administrator 108 before progressing further.

Responsive to receiving a confirmation (operation 189), management resource 120 may perform a staging operation (operation 191) by sending the firmware update to each of one or more digital light transmitters 110 in data center 101. The firmware update itself may be in the form of a digitally signed, executable data object, that performs a self-executing install of the applicable firmware update upon authenticating the signature as valid.

Each digital light transmitter 110 may then generate (operations 197) digital light by modulating one or more visible light carrier signals based on the firmware update and a modulation technique, to send-as-light the firmware update to one or more digital light receivers 104. FIG. 3 illustrates each digital light transmitter 110 providing digital light to its own corresponding group of one or more digital light receivers 104.

Information handling resources 102 may be configured to forward (operations 203) firmware updates to a management resource endpoint referred to in FIG. 3 as BMCs 173. Each BMC 173 illustrated in FIG. 3 then performs a signature verification before executing the firmware update to install and commit the updated firmware to the applicable information handling resources 102. FIGURE illustrates each BMC 173 informing (operation 205) management resource 120 of successful updates. Since there may be not return optical path, i.e., an optical path from information handling resources 102 to management resource 120, the BMC 173 may communicate the update committed messages via a convention out-of-band management connection between BMC 173 and management resource 120.

Management resource 120 may respond to the committed messages 205 by notifying (operations 207) administrator 108 that the updated firmware is released, at which time administrator 108 may return an acknowledgement 209 and perform other appropriate actions such as releasing the systems with updated firmware updates.

In at least some embodiments, updates are received by applicable digital light receivers 104 and streamed or otherwise routed to the corresponding management resource. The management resource may then read the command and payload information before deciding whether the update applies to it or not. If a match is identified, a job is created to update the firmware or server component. As a result, the update gets applied on numerous servers with a single shot of transmission.

Figure 4:
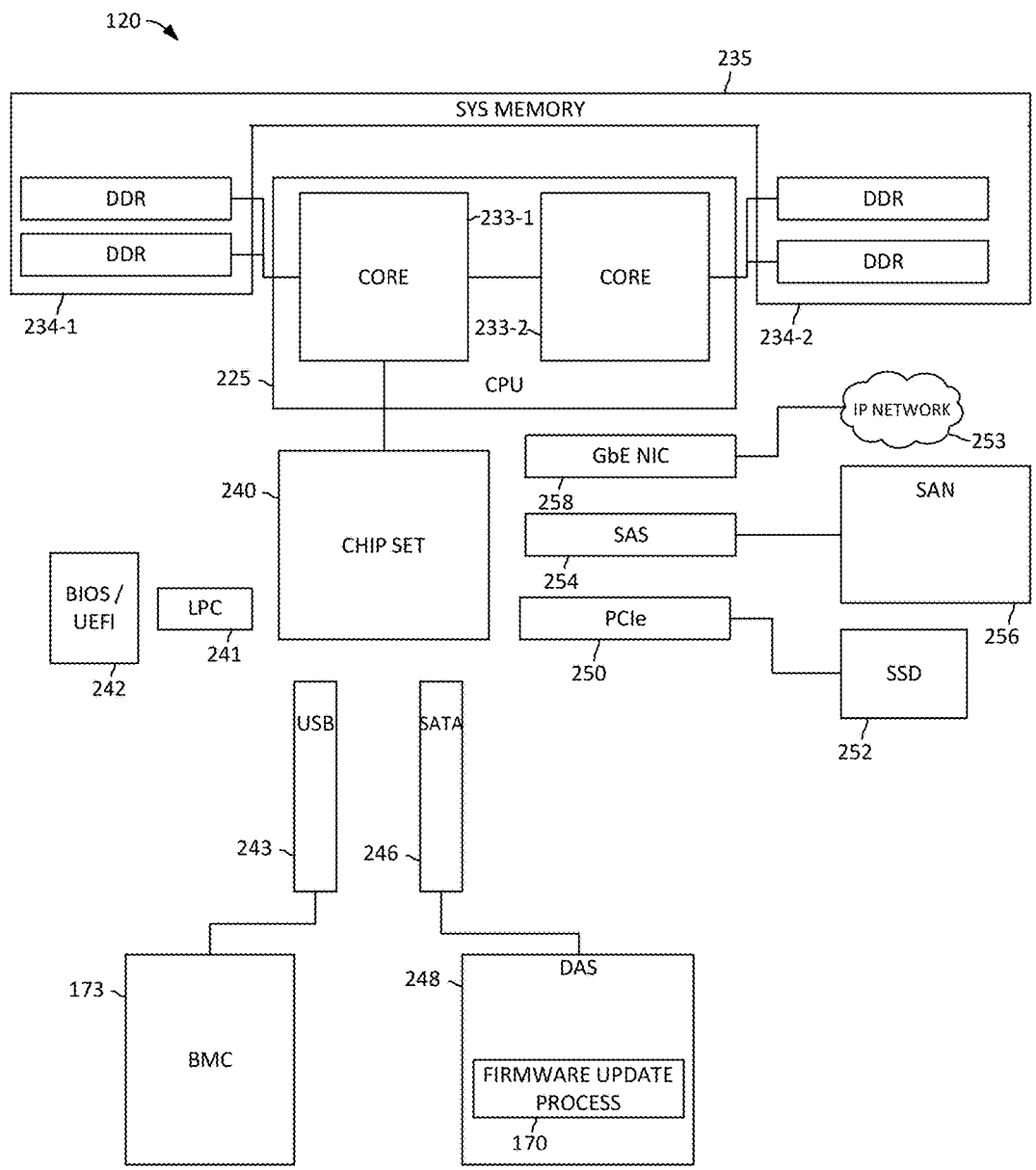
FIG. 4 illustrates a block diagram of an information handling system suitable for use in conjunction with disclosed firmware update processes.

FIG. 4 illustrates selected elements of an example management resource 120 suitable for implementing digital light firmware update process 170 (FIG. 3). The management resource 120 illustrated in FIG. 4 includes a CPU 225 coupled to a system memory 235 and a chipset 240. The CPU 225 illustrated in FIG. 4 includes dual processing cores 233-1 and 233-2, each coupled to a corresponding portion 234-1 and 234-2 of system memory 235.

The chipset 240 illustrated in FIG. 4 provides support for various I/O interfaces each supporting one or more ports, connections, or lanes as applicable. A suitable legacy or low bandwidth, low pin count (LPC) interface 241 may couple BIOS/UEFI flash 242 to chip set 240 while a universal serial bus interface 243 provides a connection between BMC 173 and CPU 225 via chip set 240. A serial ATA (SATA) interface 246 provides support for any disk-based direct attached storage 248 that managed resource 120 may include. Peripheral components interconnect express (PCIe) interface 250 provides an expansion bus to support any of a variety of peripherals including in at least some instances, a solid state drive (SSD) 252. a serial attached SCSI (SAS) interface 254 is illustrated coupled to a storage area network (SAN) storage enclosure 256 and a network interface controller 258 provides a Gigabit Ethernet connection to an internal or external network 253.

FIG. 4 illustrates the firmware update process 170 represented as CPU-executable instructions stored in direct attached storage 248 of management resource 120. Although FIG. 4 illustrates a particular configuration of management resource 120, the illustrated resource is exemplary and other embodiments, including virtualized embodiments, may be employed.

Any one or more processes or methods described above, including processes and methods associated with any flow diagrams, may be embodied as a computer readable storage medium or, more simply, a computer readable medium including processor-executable program instructions, also referred to as program code or software, that, when executed by the processor, cause the processor to perform or otherwise results in the performance of the applicable operations.

A computer readable medium, which may also be referred to as computer readable memory or computer readable storage, encompasses volatile and non-volatile medium, memory, and storage, whether programmable or not, whether randomly accessible or not, and whether implemented in a semiconductor, ferro-magnetic, optical, organic, or other suitable medium. Information handling systems may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, F/W, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. A system management method comprising:
   accessing, by a management resource configured to manage a plurality of managed servers in a data center, a firmware update; and
   providing update information indicative of the firmware update to each of a plurality of digital light transmitters located in the data center wherein each of the plurality of digital light transmitters is:
      associated with a corresponding subset of the plurality of managed servers, wherein each subset includes one or more digital light receivers; and
      configured to generate digital light indicative of the firmware update by modulating one or more visible light carrier signals in accordance with a modulation technique and the firmware update.

2. The method of claim 1, wherein each digital light transmitter comprises a Light Fidelity (LiFi) compliant transmitter and wherein each digital light receiver comprises a LiFi compliant receiver.

3. The method of claim 1, wherein each managed resource includes a digital light receiver.

4. The method of claim 1, wherein one managed resource in each subset includes a digital light receiver and wherein said one managed receiver is configured to communicate the updated package to the other receivers.

5. The method of claim 1, wherein a primary source of illumination within at least a portion of the data center comprises the digital light transmitters.

6. The method of claim 1, wherein each managed resource includes a baseboard management controller configured to receive the firmware update from a digital light receiver.

7. The method of claim 6, wherein the firmware update comprises a digitally signed data object and wherein the baseboard management controller is configured to verify the signature.

8. The method of claim 6, wherein:
   the data center includes:
   a first digital light transmitter associated with a first type of server;
   a second digital light transmitter associated with a second type of server;
   wherein a server type is indicative of at least one of:
      an operating system; and
      a firmware attribute; and
   a firmware update associated with the first type of server is provided to the first digital light transmitter but not the second digital light transmitter.

9. The method of claim 1, wherein the digital light transmitters are located at regular intervals throughout the data center and wherein a distance between adjacent digital light transmitters is less than approximately 10 meters.

10. The method of claim 1, wherein the modulation technique comprises a modulation selected from: on-off keying modulation, variable pulse position modulation, and pulse amplitude modulation.

11. The method of claim 1, wherein the modulation technique comprises:
    variable pulse position modulation.

12. A system management resource comprising:
    a processor;
    a network interface for communicating with at least one of:
       one or more managed servers; and
       one or more managed system interfaces; and
    a computer readable storage medium comprising processor executable instructions that when executed cause the process to perform operations, comprising:
       accessing, by a management resource configured to manage a plurality of managed servers in a data center, a firmware update; and
    providing update information indicative of the firmware update to each of a plurality of light fidelity (LiFi) transmitters located in the data center wherein each of the plurality of LiFi transmitters is:
       associated with a corresponding subset of the plurality of managed servers, wherein each subset includes one or more LiFi receivers; and
       configured to generate LiFi indicative of the firmware update by modulating one or more visible light carrier signals in accordance with a modulation technique and the firmware update.

13. The system management resource of claim 12, wherein a primary source of illumination within at least a portion of the data center comprises the LiFi transmitters.

14. The system management resource of claim 12, wherein each managed resource includes a baseboard management controller configured to receive the firmware update from a LiFi receiver.

15. The system management resource of claim 14, wherein the firmware update comprises a digitally signed data object and wherein the baseboard management controller is configured to verify the signature.

16. The system management resource of claim 14, wherein:
- the data center includes:
- a first LiFi transmitter associated with a first type of server;
- a second LiFi transmitter associated with a second type of server;
- wherein a server type is indicative of at least one of:
  - an operating system; and
  - a firmware attribute; and
- a firmware update associated with the first type of server is provided to the first LiFi transmitter but not the second LiFi transmitter.

17. The system management resource of claim 12, wherein the digital light comprises a single carrier signal.

18. The system management resource of claim 17, wherein the modulation technique is selected from: on-off keying modulation, variable pulse position modulation, and pulse amplitude modulation.

19. The system management resource of claim 12, wherein the digital light comprises multiple carrier signals modulated using orthogonal frequency division multiplexing.

20. The system management resource of claim 12, wherein the digital light transmitter receives multiple input signals and wherein the transmitter employs color shift keying to encode intensity value onto a plurality of multi-colored LEDs.

* * * * *